Patented Oct. 11, 1949

2,484,061

UNITED STATES PATENT OFFICE 2,484,061

DICHLORO METHYL SULFENYL CHLORIDE

Sylvan R. Wood, Stillwater, Okla., assignor to Cities Service Oil Company, Bartlesville, Okla., a corporation of Delaware No Drawing. Application May 22, 1948,
Serial No. 28,751

2 Claims. (Cl. 260—543)

1

This invention relates to chlorinated organic compounds and more particularly to dichloro methyl sulfenyl chloride, a new composition of matter.

I have discovered that dichloro methyl sulfenyl chloride made be prepared by reacting trithiane in a dry state with chlorine gas which has been previously dried by any convenient method such as by passing it through a tower containing concentrated sulfuric acid.

The trithiane used by me was prepared in the usual manner by passing hydrogen sulfide gas into a commercial formalin solution to which concentrated hydrochloric acid had been added sufficient to make a 70 per cent acid solution. Sulfuric acid has been found to be equally efficient in catalyzing the reaction which proceeds according to the following equation.

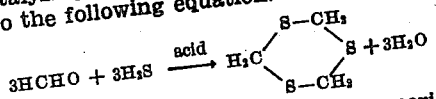

The trithiane, after an induction period of about an hour, separates as a white solid of characteristic odor. This is filtered away from the mother liquor, washed free from chlorides, and dried. The product is of a high purity, melting sharply at 215° C. and the yield is practically quantitative.

A convenient quantity of dry trithiane prepared as above is placed in a flask fitted with both an inlet and an outlet tube. Dry chlorine gas is passed in at a moderate rate above the surface of the trithiane. After a few minutes the formation of a yellowish red liquid may be observed, the amount of this liquid increasing rapidly until the solid trithiane has completely disappeared. The liquid effervesces noticeably throughout the reaction, the hydrochloric acid evolved being carried off through the outlet tube. The reaction is highly exothermic and must be controlled by immersion of the reaction flask in a water-ice mixture, since if the temperature is allowed to rise too high, a secondary reaction sets in which will reduce the yield of dichloro methyl sulfenyl chloride.

When evolution of hydrochloric acid has finally ceased, the reaction is complete. For a small sample of trithiane for instance, from say 10 to 15 grams, the conversion is complete in from one-half to three-quarters of an hour. The time may be shortened by removal from the cooling bath at frequent intervals to allow a moderate rise in temperature, but, as has been stated above, the temperature should not be allowed to rise substantially, otherwise a secondary reaction will take place. The product appears as a yellowish red mobile liquid with a disagreeable odor strongly resembling that of sulfur monochloride. Traces of chlorine and hydrochloric acid remaining in

2 the product may be removed by bubbling an inert gas through it.

The yield of crude product on four runs averaged slightly over 94 per cent with amounts of trithiane varying from five to fifteen grams being used. The conversion appears to be practically quantitative. Individual yields varied from about 92.5 per cent to as high as about 95.1 per cent The difference between these figures and 100 per cent is no doubt due to the occurrence of a secondary reaction.

A number of such preparations were made with quantitative measurements of the reactants and the reaction products from which the following summary is typical:

| | Grams |
|---|---|
| Weight of trithiane | 4.92 |
| Weight of chlorine | 14.83 |
| Weight of chlorine combined | 10.04 |
| Weight of product | 14.96 |
| Weight of chlorine uncombined | 4.79 |
| Weight of hydrogen chlorine found | 4.32 |

Thus six mols of chlorine were consumed in converting one mol of trithiane into three mols of dichloro methyl sulfenyl chloride and three mols of hydrogen chloride. The trithiane molecule apparently splits into three equal parts with each ($CH_2$—S) group adding three atoms of chlorine while splitting out one atom of hydrogen as hydrogen chloride, which is vaporized from the system. The sulfenyl chloride is a yellowish red fuming liquid with an odor resembling the sulfur chlorides. Its important physical and chemical properties have been determined as follows:

| | |
|---|---|
| Molecular weight: | |
| By freezing point lowering in benzene | 156.2 |
| Theoretical | 151.5 |
| Density | 1.6143/34° C. |
| Refractive index | 1.5428/34° C. |
| Specific refractivity | 0.1947 |
| Molecular refractivity | 29.49 |
| Molecular refractivity, theoretical | 29.11 |

The chemical composition was determined by repeated analyses for chlorine and sulfur content:

| | Per cent |
|---|---|
| Chlorine value: | |
| Found | 70.65, 70.09 |
| Theoretical for $Cl_2$—CH—S—Cl | 70.25 |
| Sulfur value: | |
| Found | 23.0, 21.1 |
| Theoretical for $Cl_2$—CH—SCl | 21.15 |

In order to determine the activity of the chlorine atoms of the compound, a weighed sample of the compound dissolved in alcohol was treated with alcoholic potassium hydroxide until active chlorine was completely precipitated as potassium chloride which was filtered, washed with benzene, dried and dissolved in distilled water. Chloride was then determined both volumetrically and gravimetrically. The gravimetric equivalents of active chlorine per mol were 1.93 and the volumetric equivalents of active chlorine per mol was 2.00.

From this data it is evident that the compound has two readily replaceable chlorine atoms. In odor and color this compound closely corresponds to the class of compounds described as the sulfenyl halides in which a halogen atom is attached to sulfur, the sulfur in turn being attached to carbon. The halogen atom attached to sulfur in the sulfenyl halides is known to possess high activity. In the present case two of the chlorines were undoubtedly attached to carbon, one of these also being active, due no doubt to an electron shift which tends to render the carbon atom more highly negative. Two possible structures are indicated for the empirical formula, $CHSCl_3$. These may be represented as (a) $CHCl_2$—S—Cl and (b) $CCl_3$—S—H. Of these (b) is improbable in view of the observed appearance and behavior of the compound, especially its nonacidic, nonmercaptan properties. From its close resemblance to sulfur monochloride it is indicated that the compound has the structural formula represented by (a).

The product reacts with olefins by addition, with the active halogen of the sulfenyl chloride attaching to one carbon atom and the chloro methyl sulfide group attaching to the adjacent carbon atom. Thus cyclohexene reacts readily with the sulfenyl chloride forming a dark oily product with combined chlorine and sulfur.

My new product, dichloro methyl sulfenyl chloride, promises to be extremely useful as an intermediate for various other organic syntheses which have not as yet been attempted.

Having now described my invention, what is claimed is:

1. Dichloro methyl sulfenyl chloride.
2. The method of synthesizing dichloro methyl sulfenyl chloride comprising reacting dry trithiane with dry chlorine gas until the reaction is complete.

SYLVAN R. WOOD.

REFERENCES CITED

The following references are of record in the file of this patent:

UNITED STATES PATENTS

| Number | Name | Date |
|---|---|---|
| 2,123,082 | Schulze | July 5, 1938 |

FOREIGN PATENTS

| Number | Country | Date |
|---|---|---|
| 879,526 | France | Feb. 25, 1943 |

OTHER REFERENCES

Klason, Berichte, vol. 20, pp. 2377–2378 (1887).
Remboldt et al., Berichte, vol. 72B, pp. 657–680 (1939).
Fuson et al., J. Org. Chem., vol. 11, pp. 469, 474 (1946).